Sept. 28, 1948.            H. S. MAXWELL            2,450,290
              DYNAMOELECTRIC MACHINE
                  Filed July 1, 1947

Inventor:
Hugh S. Maxwell,
by Browell S. Mack
His Attorney.

Patented Sept. 28, 1948

2,450,290

UNITED STATES PATENT OFFICE 2,450,290

DYNAMOELECTRIC MACHINE

Hugh S. Maxwell, Schenectady, N. Y., assignor to General Electric Company, a corporation of New York Application July 1, 1947, Serial No. 758,447

4 Claims. (Cl. 172—36)

My invention relates to dynamoelectric machines provided with gears making the same adaptable for use as gear motors or geared generators. Gear motors, and generators, have heretofore generally employed a gearing mechanism located adjacent the dynamoelectric machine elements, the gearing and electrical machine being located either within the same or within separate housings. This arrangement requires considerable mounting space and has the disadvantage of an assembly subject to misalignment and distortion.

It is an object of my invention to provide simple and inexpensive means for overcoming these difficulties.

It is a further object of my invention to provide a geared electric machine less subject to misalignment and occupying a space substantially as small as would the dynamoelectric machine without the gearing.

Broadly, the means employed in the embodiment herein illustrated and described comprises a gear motor having a stator and a rotor with gearing substantially all contained within the inner bore of the rotor.

Figure 1:
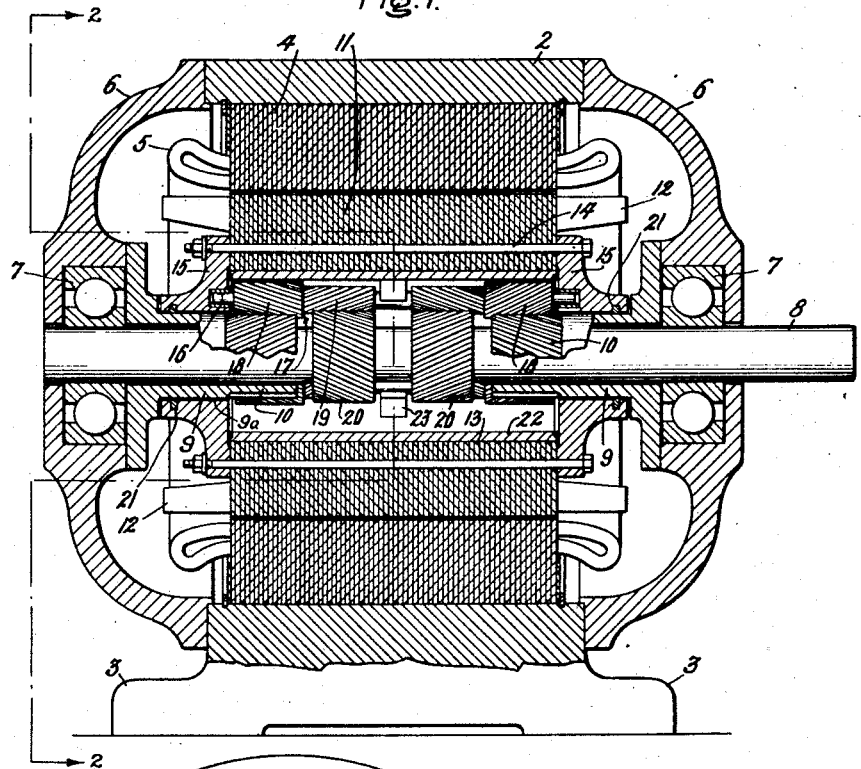
Figure 2:
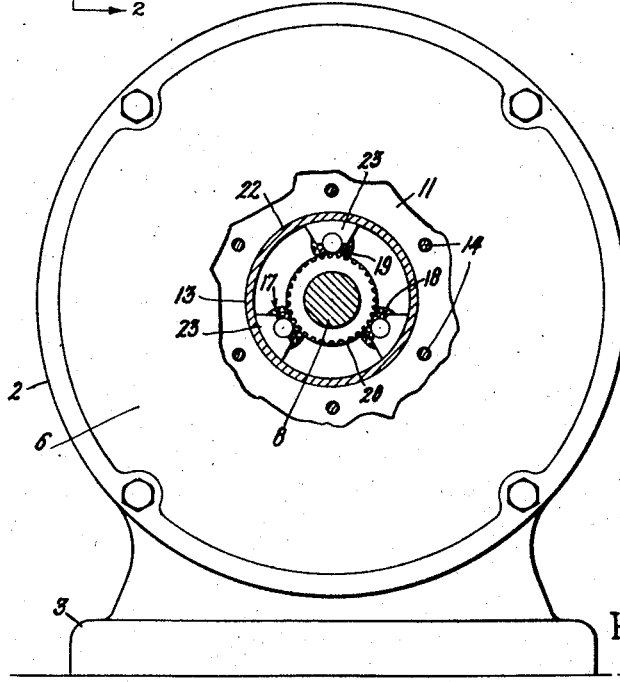

Other aspects of the invention will appear from consideration of the following description taken in connection with the accompanying drawing, in which Fig. 1 is a side elevational view, partly in section, of an electric motor embodying my invention, and Fig. 2 is an end view, partly in section, taken on the line 2—2 of Fig. 1.

I have shown in Fig. 1 my invention in connection with a squirrel cage induction motor having a stator portion whch includes a stationary central yoke or frame 2 provided with feet 3. Attached to frame 2 is a magnetic core portion 4 of laminated construction and provided with a conventional stator winding 5. The stator portion also includes two end bells 6 each adapted to hold a conventional bearing 7 for supporting the rotatable shaft 8. Attached to the inner side of each of the end bells 6 is an annular sleeve 9 having an inner bore just large enough to provide a close running clearance between itself and shaft 8. Each sleeve 9 terminates, at its axially inner end, in a stationary sun gear 10.

The rotor portion of the machine includes the magnetic core portion 11 of laminated construction and provided with a conventional squirrel cage winding (not shown) and conventional rotor fan blades 12. The rotor is arranged to react electrodynamically with the stator core. While said rotor is interposed between the stator and the shaft, the rotor portion, and more specifically the magnetic core portion 11 thereof, has an inner bore 13 substantially larger than the diameter of shaft 8 in order to accommodate gearing between rotor and shaft. Inner bore 13 is preferably the maximum which may be provided without interfering with the desirable magnetic properties of the rotor core.

A plurality of through bolts 14 secure two rotor end plates 15 to the laminations of motor 11. Each rotor end plate 15 has an inner bore just large enough to provide a close running clearance with the corresponding cylindrical outer surface of each sleeve 9. End plates 15 also include a plurality of bearings 16 which act as end bearings for a planetary gear set comprising planet gears 17 which in the embodiment described are in 120 deg. spaced relationship. The planet gears include the tracking planet gears 18 which engage sun gears 10, and also the driving planet gears 19 having a number of teeth different from that of gears 18. Gears 18 and gears 19 are preferably formed from a single piece which my also include the shafting so that excessive stresses are not imposed on a relatively small pinion shaft. The six driving planet gears 19 mesh with shaft gears 20 which are solidly rotatable with the output shaft 8. The entire gear assembly is enclosed by an oil and grease tight enclosure formed by the end plates 15 (together with annular gaskets such as 21 providing a running seal with sleeves 9) and by an annular cylinder 22 arranged around the inner periphery of the rotor bore to prevent lubricant leaking in between the rotor laminations. In some applications it may be desirable to use a cylinder 22 of sufficiently rigidity to be adaptable to securing thereto three pillow blocks 23 to support the planet gear assemblies 17 at their mid-points.

In Fig. 2 I have shown an end view of the machine shown in Fig. 1, the center being cut away to show the 120 deg. spaced relationship of the planet gears 17 supported by pillow blocks 23 at their mid-points.

In the operation of the embodiment illustrated, the rotor portion is carried around by electrodynamic reaction between it and the stator member, causing the planetary gear set to rotate so that the planetary tracking gears 18 rotate by tracking on stationary sun gears 10. Since tracking and driving planet gears are mechanically integral, this causes rotation of driving planet gears 19 which, in turn, drive the shaft gears 20 to cause rotation of the output shaft 8. If planet gears 18 and 19 had exactly the same number of teeth they would, of course, rotate together around gears 18 and 20 and there would be no rotation of the output shaft, or in other words, the speed reduction ratio would be infinity. By making the effective size of each planet gear 19 slightly smaller, or larger, than that of each planet gear 18, a large speed reduction ratio is obtained so that, while the dynamoelectric members operate with the good running characteristics of a high speed motor, a low speed high torque output is produced in shaft 8. While this is an advantage common to all gear motors, with my invention there is the further advantage that the gears do not require extra mounting space because they are contained in a space conventionally occupied by non-active material. In addition the application of my invention to a motor, or generator, allows the use of parts less subject to bending stresses and misalignment.

There is thus provided a device of the character described which is capable of meeting the objects hereinabove set forth. While I have illustrated and described my invention as applied to a squirrel cage motor, it will be obvious to those skilled in the art that it is equally applicable to a direct current motor in which a speed reduction is desired, or to an alternator or direct current generator in which it is desired to have the rotatable electrodynamic member rotate at a speed different from that of the shaft which makes the external mechanical connection. In other words, I desire to be understood that my invention is not to be limited to the particular arrangement disclosed since modifications will occur to those skilled in the art and I intend in the appended claims to cover all modifications which do not depart from the spirit and scope of my invention.

What I claim as new and desire to secure by Letters Patent of the United States is:

1. A dynamoelectric machine having a rotatable shaft, a stator portion including end bells having bearings adapted to receive said shaft, a rotor portion arranged to react electrodynamically with said stator portion and interposed between said stator and said shaft, said rotor portion having an inner bore substantially larger than the diameter of said shaft, a planetary gear set including tracking and driving planet gears, bearings for said planetary gear set in said rotor portion, means including stationary annular sleeves attached to said end bells and extending axially inward therefrom and having gaskets for providing a running seal, said sleeves being provided with stationary sun gears for said tracking planet gears of said set of planetary gears, means including at least one shaft gear rotatable with said shaft and meshing with said driving planet gears of said planetary gear set to provide mechanical connection between said rotor portion and said shaft through said set of planetary gears.

2. A dynamoelectric machine having a rotatable shaft, a stator portion including end bells having bearings adapted to receive said shaft, a rotor portion arranged to react electrodynamically with said stator portion, means including stationary annular sleeves attached to said stator portion to provide surfaces for a running seal for gear enclosure, a planetary gear set rotatable with said rotor portion and comprising tracking and driving planet gears, means including stationary sun gears to provide tracks for said tracking planet gears of said planetary gear set, means including shaft gears rotatable with said shaft for interconnecting said shaft and said rotor portion through said set of planetary gears by meshing with said driving pinion gears, and means including rotor end plates and including a cylindrical shell to provide a lubricant tight housing for all of said gears.

3. An electric motor having a rotatable shaft, a stator portion including end bells having bearings adapted to receive said shaft, a rotor portion arranged to react electrodynamically with said stator portion, means including stationary annular sleeves attached to said stator portion to provide stationary sun gears, a planetary gear set rotatable with said rotor portion and comprising tracking and driving planet gears, means including shaft gears rotatable with said shaft and meshing with said driving planet gears of said planetary gear set to cause rotation of said rotor portion to drive said shaft at a predetermined speed reduction ratio, and means including end plates and a cylindrical shell around the inner periphery of said rotor to provide a lubricant tight housing for all of said gears.

4. An electric gear motor having a stationary central frame portion including a stationary magnetic core provided with a winding, end bells attached to said central frame, a rotatable shaft, a stationary sleeve extending axially inward from each of said end bells and surrounding said shaft, each of said sleeves being provided with a cylindrical surface at an outer periphery thereof and being provided with a sun gear adjacent said cylindrical surface, a rotor portion comprising a magnetic core portion provided with a squirrel cage winding and arranged to react electrodynamically with said stator core, said rotor portion including end plates adapted to rotate about said cylindrical surfaces, said end plates having bearings for the tracking and driving planet gears of a planetary gear set, said tracking planet gears meshing with said sun gears, shaft gears solidly rotatable with said shaft, said driving planet gears of said planetary gear set being solidly rotatable with said tracking planet gears but having a different number of teeth from said tracking planet gears, and said driving planet gears of said planetary set meshing with said shaft gears, all of said gears being radially interposed between said rotor magnetic core portion and said shaft, and a cylindrical casing at the inner periphery of said rotor member and interconnected with said end plates to form a lubricant tight housing for all of said gears.

HUGH S. MAXWELL.

REFERENCES CITED

The following references are of record in the file of this patent:

UNITED STATES PATENTS

| Number | Name | Date |
| --- | --- | --- |
| 1,118,616 | Apple | Nov. 24, 1914 |
| 2,247,645 | Suydam | July 1, 1941 |